(12) United States Patent
Baum

(10) Patent No.: US 9,211,426 B2
(45) Date of Patent: Dec. 15, 2015

(54) DEVICE AND METHOD FOR PROTECTION DURING ASCENT

(75) Inventor: Christoph Baum, Plauen (DE)

(73) Assignee: Andrea Boettcher, Schneeberg (DE)

( * ) Notice: Subject to any disclaimer, the term of this patent is extended or adjusted under 35 U.S.C. 154(b) by 212 days.

(21) Appl. No.: 13/809,282

(22) PCT Filed: May 12, 2011

(86) PCT No.: PCT/EP2011/057731
§ 371 (c)(1),
(2), (4) Date: Jan. 9, 2013

(87) PCT Pub. No.: WO2012/004033
PCT Pub. Date: Jan. 12, 2012

(65) Prior Publication Data
US 2013/0105251 A1   May 2, 2013

(30) Foreign Application Priority Data
Jul. 9, 2010   (DE) .......................... 10 2010 031 208

(51) Int. Cl.
*A62B 1/08*      (2006.01)
*A62B 35/00*     (2006.01)
(Continued)

(52) U.S. Cl.
CPC . *A62B 35/00* (2013.01); *A62B 1/08* (2013.01); *A62B 1/14* (2013.01); *A62B 35/0068* (2013.01); *E04G 21/3204* (2013.01); *E06C 7/186* (2013.01); *F16D 59/00* (2013.01)

(58) Field of Classification Search
CPC ............ A62B 1/08; A62B 1/14; A63B 27/00; A63B 29/02; E04G 21/3204
USPC .............................. 188/65.1, 65.2, 65.4, 65.5
See application file for complete search history.

(56) References Cited

U.S. PATENT DOCUMENTS 4,494,629 A * 1/1985 Raeburn ....................... 188/65.5
4,662,475 A * 5/1987 Rutschi et al. ..................... 182/5
(Continued)

FOREIGN PATENT DOCUMENTS

DE    71 03 612      4/1971
DE    24 12 987      10/1975
(Continued)

OTHER PUBLICATIONS

ISC Brochure, Bangor, Gwynedd/UK, 2010.
(Continued)

*Primary Examiner* — Anna Momper
(74) *Attorney, Agent, or Firm* — Muirhead and Saturnelli, LLC

(57) ABSTRACT

A device and method are provided for protection during ascent, in particular, for climbing electricity poles, trees or other high structures. The device, including a non-fixed rope that is to be carried by the ascending person, includes a retaining means for fixing the device to a fixed anchoring point in a predetermined position. A structural configuration enables the introduction of the rope into the device, fixed in the predetermined position, from below. A first redirecting means is provided by which the rope can be guided through the device on a curved path. A mechanism automatically locks off the rope when the speed of movement of the rope through the device exceeds a predetermined limit value. A second redirecting means is provided by which the rope emerging from the device can be guided out of the device in the direction of ascent. A laterally arranged flat first bearing surface is provided.

18 Claims, 8 Drawing Sheets

(51) Int. Cl.
   *A62B 1/14*   (2006.01)
   *E06C 7/18*   (2006.01)
   *E04G 21/32*  (2006.01)
   *F16D 59/00*  (2006.01)

(56) References Cited

U.S. PATENT DOCUMENTS

| | | | |
|---|---|---|---|
| 5,060,758 A * | 10/1991 | Ishioka | 182/234 |
| 6,745,868 B2 | 6/2004 | Cheval | |
| 2006/0070809 A1 * | 4/2006 | Barzilai | 182/193 |
| 2006/0283662 A1 | 12/2006 | Martin et al. | |
| 2009/0045010 A1 * | 2/2009 | Jordan | 182/5 |
| 2010/0032239 A1 | 2/2010 | Rinklake et al. | |
| 2011/0048852 A1 * | 3/2011 | Wolf et al. | 182/5 |

FOREIGN PATENT DOCUMENTS

| | | |
|---|---|---|
| DE | 39 05 476 A1 | 8/1990 |
| DE | 40 19 319 A1 | 12/1991 |
| DE | 299 15 360 U1 | 11/1999 |
| DE | 203 06 119 U1 | 6/2003 |
| DE | 203 14 230 U1 | 11/2003 |
| DE | 20 2006 002 559 U1 | 4/2006 |
| DE | 20 2008 010 819 U1 | 10/2008 |
| DE | 10 2008 028 647 A1 | 12/2009 |
| DE | 20 2009 014 714 U1 | 1/2010 |
| EP | 0 577 587 A1 | 1/1994 |
| EP | 1 671 009 B1 | 6/2006 |
| EP | 1 820 539 B1 | 2/2007 |
| WO | WO 99/55425 | 11/1999 |
| WO | WO 2009/153147 A1 | 12/2009 |
| WO | WO 2011/050881 A1 | 3/2011 |

OTHER PUBLICATIONS

"Belaying,", Wikipedia Article, http://en.wikipedia.org/wiki/Belaying, visited Jan. 5, 2013.

* cited by examiner

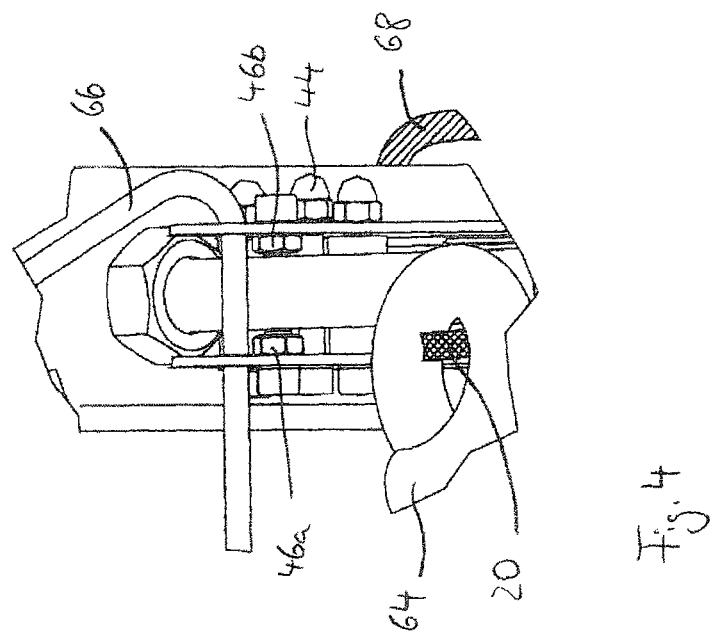
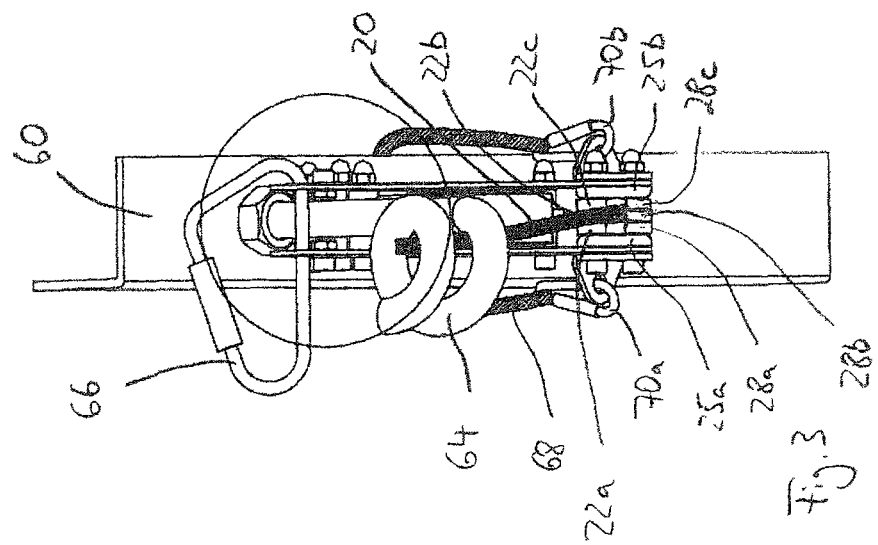

DEVICE AND METHOD FOR PROTECTION DURING ASCENT

TECHNICAL FIELD

This application relates to a device and method for protection during ascent, in particular for climbing electricity poles, trees or other high structures.

BACKGROUND OF THE INVENTION

From practice, a plurality of devices for protection during ascent is known. In particular, concurrently moving devices for protection during ascent are used. They are normally used together with already existing strong ropes or other structures (e.g. C-profiles of ladders etc.). Concurrently moving devices for protection during ascent are connected with the strong rope or C-profile and are moved along upwards by the ascending person. The distance between a concurrently moving device for protection during ascent and the ascending person is therefore always relatively small, in most cases smaller than 50 centimeters. Thus the rope extending from the device for protection during ascent to the ascending person is normally limited in its length and forms an integral part of the device. Concurrently moving devices for protection during ascent are known from EP 1 671 009 B1, DE 203 14 230 U1, DE 20 2008 010 851 U1, DE 40 19 319 A1, WO 99/55425, DE 7 103 612, DE 20 2006 01 819 U1, DE 203 06 118 U1, DE 20 2006 002 559 U1 and DE 20 2009 014 714 U1, for example. The concurrently moving devices for protection during ascent are disadvantageous in that always an existing infrastructure (preinstalled rope, slide rail etc.) is required for using the device for protection during ascent. The existing infrastructure must be maintained at regular intervals, which is time-consuming and cost-intensive.

As an alternative to the guided-type devices for protection during ascent, protection techniques known from mountaineering are used for climbing high structures, in particular the so-called lead-climbing belay. When using the lead-climbing belay, the ascending person is connected with one rope end and carries the rope along upwards. The ascending person places the rope at regular intervals around intermediate belays to limit the height of fall in case of a fall.

For climbing electricity poles and other poles and structures the safety climbing rungs described in EP 577 587 B1 have been developed as intermediate belays. At the bottom of the structure to be climbed a second person is located for protecting the ascending person. The lead-climbing belay is disadvantageous in that always two persons are required for safely climbing a structure. Further, full concentration of the protecting person is necessary. In case of inattention or application errors there is a risk that the ascending person falls despite the lead-climbing belay and gets injured.

From DE 39 05 476 A1 a rotary-shackle rope brake for mountaineers is known which is supposed to be adapted for use as a concurrently moving device for protection during ascent and as a lead-climbing belay. It is, however, not apparent how this rotary-shackle rope brake can be reliably fixed at the bottom of a belay station, in particular at an electricity pole.

Alternatively, ascent can be performed using two connecting means, including karabiners. During ascent or descent the user alternately places karabiners around the ribs of the structure to be climbed, which are clipped in a vertically offset manner. Thus they can ascend in a completely protected manner. This method is disadvantageous in that the karabiners destined for being clipped into the structure have very large dimensions depending on the thickness of the existing profiles and are thus cumbersome to use. This unfavorable climbing ergonomics precisely leads to fatigue of the climber and frequently to a fall due to their awkward posture. Moreover, precisely in the case of steel lattice pole structures the karabiners, when load is applied to them, are frequently loaded in a position not in accordance with the conformity testing for karabiners. The design of the diagonally extending ribs at steel lattice poles may, under certain conditions, cause canting of the karabiner, which may re-suit in an unintentional opening of the locking mechanism and possibly to breakage of the karabiner and fall of the user. This method is further disadvantageous in that rescue of the fallen person suspended from the structure always requires that the rescuer ascend to the location of the accident victim.

Besides the devices for protection during ascent described above, fall protection systems are available which are arranged at the highest point of a structure to be climbed and in case of a fall lock off the rope from which the person to be protected is suspended. These devices are disadvantageous in that they can be used only if they have already been preinstalled and if it is possible to guide a rope through them prior to ascent. The installation of a fall protection system requires either an unprotected ascent of another person or use of auxiliary means, such as a crane, helicopter etc. Fall protection systems are thus not suitable for an uncomplicated and secure first ascent of a structure. If fall protection systems are pre-installed, they must be maintained at regular intervals, which is time-consuming and cost-intensive, in particular for very high structures.

Accordingly, it would be desirable to provide a device and a method which allow a single person to safely and unassistedly climb a high structure, in particular an electricity pole, without preinstalled protection systems, avoiding, at the same time, the remaining disadvantages of the other methods described above.

SUMMARY OF THE INVENTION

According to one or more embodiments of the system described herein, a device according to the invention for protecting an ascending person during ascent, comprising a non-fixed rope that is to be carried by the ascending person, includes a) retaining means for fixing the device to a fixed anchoring point in a predetermined position,
b) a structural configuration which enables introduction of the rope from below into the device that is fixed in the predetermined position,
c) at least one first redirecting means by means of which the rope to be introduced into the device can be guided through the device on a curved path,
d) a mechanism that automatically locks off the rope when the speed of movement of the rope through the device exceeds a predetermined limit value,
e) wherein at least one second redirecting means is provided by means of which the rope emerging from the device can be guided out of the device in the direction of ascent, and wherein
f) a laterally arranged flat first bearing surface is provided.

According further to one or more embodiments of the system described herein, the device according to the invention offers the advantage that it allows ascent in accordance with the method according to the invention, the method comprising the following steps:

a) placing the first bearing surface of the device on a flat bearing surface of the object to be climbed, b) fixing the device using upper retaining means and/or using lower retaining means on a structure to be climbed, c) only if the device according to the invention is not yet provided with a preinstalled rope: guiding the non-fixed rope end of a rope into the device from below, around the first redirecting means and around the second redirecting means in the direction of ascent, d) connecting the rope guided through the device with an ascending person, e) carrying the rope by the ascending person during the ascent, and f) clipping the rope at regular intervals into safety structures which cause the rope to be redirected in case of a fall and reliably carry the weight of the ascending person, in particular clipping the rope into safety climbing rungs.

The device according to the invention and the method according to the invention offer the advantage that a person can safely and unassistedly climb a high structure. In case of a fall the mechanism of the device according to the invention causes the rope to be locked off and retained by the device according to the invention. In particular, with only one device according to the invention a plurality of structures can be climbed one after the other since the device is compactly dimensioned and portable and the device can be fixed, for ascending purposes, at the bottom of a structure to be climbed. Climbing a high structure does not require use of preinstalled high-maintenance devices. Nor does the device according to the invention necessitate a second person to be present for ensuring safe ascent. Further, the device according to the invention allows lowering of a freely suspended person from the bottom of the climbed structure (from below). It is therefore not necessary that a second person also ascend the structure for rescuing a fallen person. This considerably reduces the time required for rescue.

By retaining means within the meaning of the invention we are to understand both passage holes provided on the device and retaining elements arranged at the device, such as retaining rings, angle elements, tensioning elements, openings for accommodating retaining structures or other elements which allow the device according to the invention to be fastened at a fixed anchoring point, for example at an electricity pole, a ladder, etc. Elements having passage holes allow in particular chains, ropes and other fixing elements to be used for fixing the device in position.

By a structural configuration allowing the rope to be introduced into the device, fixed in the predetermined position, from below we are to understand that the device according to the invention comprises an opening, for example, which allows a rope to be introduced into the device from below and to be placed around the first redirecting means without the rope abutting against housing edges or other elements of the housing which would cause undesired friction when the rope moves. In an embodiment, the rope can be guided to the first redirecting means from below without direct contact with the device such that it is possible to unassistedly pull a wound-up long rope lying on the floor from the floor in upward direction and through the device.

In an embodiment, the rope is one that corresponds to those ropes which are used in the rope access and positioning technique. These comply with valid standards and are semi-static. Alternatively, another embodiment of the device according to the invention provides for use of dynamic climbing ropes. In an embodiment, both rope variants are ropes with a diameter of 9-13 mm, preferably 9 mm, 11 mm and 12 mm. In various embodiments, the device is used with ropes in signal colors such as red, orange or yellow.

In another embodiment, the rope can be introduced into the device from the side or from above if it is ensured that a sufficient amount of rope can be supplied from this direction and that even in case of the rope slackening there is no risk that the rope gets jammed in the device. This can be effected, for example, by introducing the rope into the device via two rollers from the side or from above, wherein the rollers are arranged at a distance approximately corresponding to the diameter of the rope (deviation from the diameter of the rope: −10% to +20%, preferably 0% to 15%).

By a redirecting means within the meaning of the invention we are to understand in particular a rotatably supported element (e.g. a rope pulley) which allows a rope to be guided around said element in a low-friction manner. In an embodiment, the cross section of such a rope pulley is configured such that it comprises in its center a recess for guiding the rope, said recess counteracting drift of the rope to the sides.

As a mechanism causing automatic locking off of the rope when the speed of movement of the rope through the device exceeds a predetermined limit value, in particular a locking element controlled by centrifugal force can be used.

Such locking elements controlled by centrifugal force are known from the technical field of devices for protection during ascent or fall protection systems. For example, a mechanism of a known fall protection device can be used as such a mechanism. Of course, instead of a centrifugal brake another mechanism can be used which causes automatic locking off of the rope when a predetermined speed of the rope is exceeded. Further, it is in particular possible to electronically detect the speed of the rope and effect locking off via a motor or any corresponding mechanism.

With regard to the second redirecting means, in analogy to the first redirecting means, the rope emerging from the device can be guided out of the device in the direction of ascent without the rope, when passing through the device, being subjected to strong mechanical stress due to friction at an edge or to a small radius, in particular a radius which is smaller than 10 mm. In accordance with the method according to the invention the ascending person guides the rope, which is stored, for example, on the floor in a drum, bag or another storage element, through the device and then carries it onto the object to be climbed. The ascending person permanently pulls the rope through the device. In order to allow the rope to be particularly smoothly pulled through the device according to the invention and not to be excessively stressed, the redirecting means should enable low-friction guiding of the rope. In an embodiment, this can either be realized by large radii of 10 mm or more or particularly by rotatably supported redirecting means which essentially by means of the rope support reduce the amount of rope being pulled and any slippage of the rope in the region of the redirecting means.

As can be gathered from the independent method claim, feature c)) is required only if the device according to the invention has not yet been provided with a preinstalled rope. For it is also possible that the device according to the invention already comprises a rope which is guided through the device in the manner described above. Optionally, the rope may already be equipped with a fall arrester at the end where the rope is fastened to a person. Alternatively or additionally, the device according to the invention may comprise a passage-type or friction fall arrester.

In a practical embodiment of the invention, the second redirecting means is a guide roller which is arranged on the side of the device opposite the flat bearing surface. If it acts as lateral boundary of the device, there are no further elements of the device projecting in the horizontal direction to the outside from the side of the second redirecting means.

In a further practical embodiment, particularly in the upper half of the device, a rope guide is provided at a horizontal distance ranging between 10 and 50 cm to the first bearing surface, preferably at a horizontal distance ranging between 10 and 30 cm, and particularly preferably at a horizontal distance ranging between 15 and 25 cm. In an embodiment, the distance is selected such that the rope can be guided from the rope guide in a vertically upward direction and through the fastening eye of a safety climbing rung according to EP 577 587 B1 mounted at a structure. In this case, rope friction during ascent is particularly low, which allows a person to ascend in an effort-saving manner.

If a second bearing surface arranged transversely to the first bearing surface is provided, the device according to the invention can be particularly reliably fastened to an object to be climbed. This applies in particular if the second bearing surface is U-shaped and arranged perpendicularly to the first bearing surface. Then the first bearing surface can, for example, be aligned such that it laterally bears upon an electricity pole, and the U-shaped bearing surface can be arranged such that it embraces the safety climbing rung of a structure. In this case, with the aid of the first and second bearing surfaces, the device according to the invention can be very well fitted to the object to which it is to be fixed, whereby reliable fastening is facilitated.

In particular when the device according to the invention is to be used together with the safety climbing rungs according to EP 577 587 B1, it is further advantageous for the second bearing surface to be arranged such that its center plane extends spaced apart from at least one center plane of a redirecting means.

Providing, on the upper side of the device, of a flat tread with a length of at least 10 cm, preferably with a length of 12 to 20 cm, and particularly preferably with a length of 14 to 18 cm, and a width which corresponds at least to the width of a safety climbing rung according to EP 577 587 B1 facilitates start of the ascent of an electricity pole with the aid of the device according to the invention. Further, in the case of descent it is ensured that the descending person can safely tread on the last (secured) safety climbing rung. Since the dimensions of the tread are different from those of the safety climbing rungs, a descending person further receives the haptic feedback that they have reached the device according to the invention.

In a practical embodiment, the first redirecting means and/or the second redirecting means deflect(s) the rope by 120° to 240°, preferably by 150° to 210°, and particularly preferably by 170° to 190°. In particular if the first redirecting means deflects the rope by an angle of the aforementioned range, the device can be realized at least partly with a known fall protection system. However, in addition to the fall protection system a second redirecting means is required to allow the rope to be introduced into the device from below and guided out of the device in the direction of ascent, and to simultaneously ensure that the rope does not come in contact with other elements when passing through the device, which would lead to mechanical stress (e.g. abrasion at small radii and/or edges).

In another practical embodiment of the device according to the invention, a guide member is arranged in the region of the second redirecting means, wherein between the guide member and the second redirecting means a distance of 5 to 20 mm, preferably a distance of 10 to 18 mm, and particularly preferably a distance of 12 to 14 mm is provided. The use of such a guide member offers the advantage that a rope guided through the device according to the invention, whose rope end does not extend in a linearly upward direction but which is temporarily slack from the exit of the device to the rope end, does not move back into the device but is essentially held in position by the guide member and the second redirecting means. The distance between the guide member and the second redirecting means is preferably chosen with a dimension which approximately corresponds to the recommended rope diameter (deviation from the diameter of the rope: −10% to +20%, particularly preferably 0% to 15%). The guide member further offers the advantage that it can be arranged and configured such that the rope can be guided and moved out of the device in downward direction as well, without there being a risk that the rope is subjected to strong mechanical stress due to friction at edges, small radii, etc.

In an embodiment, the guide member comprises a pivot bearing, and particularly a roller bearing. In this case, the guide member can rotate in a low-friction manner when it comes into contact with the rope and the rope slides along the guide member. Thus, the force which is required for pulling the rope through the device can be reduced. It is obvious that instead of roller bearings other bearings can be used if a support suitable for the intended use is possible.

In another practical embodiment of the device according to the invention, the retaining means comprise two upper retaining elements spaced apart from each other and including passage holes, wherein the retaining elements define an opening. These are meant to allow the device to be positioned inside the opening such that a structure, in particular the rung of an electricity pole, on which the device is to be suspended extends between the retaining elements and that the device can be fixed to the structure in a suspended manner by guiding a protection element through the passage hole. Suitable protection elements are in particular a bolt, a karabiner or a belt. The retaining means described above offer the advantage that a position of the retaining elements adapted to the intended use of the device according to the invention can ensure proper positioning of the device according to the invention at the element to be climbed. For this purpose, the distance of the upper retaining elements must merely be selected such that suspending of the device is intuitively conditioned by the distances. For example, the distance between the two retaining elements can be selected to be only slightly larger than the structure in which the device is to be suspended. If the device is intended for climbing an electricity pole having standard rungs or safety climbing rungs with a diameter of approximately 24 mm, the distance between the two retaining elements can, for example, be selected to be 26 to 30 mm, preferably 28 mm. In various embodiments, the distance between the retaining elements may be larger by 0% to 30%, and particularly by 1% to 15%, than the structure for which the device according to the invention is destined.

In another advantageous embodiment of the invention, the retaining means comprise at least one passage hole with a flat contact surface for fixedly tensioning the device with the aid of a belt, wherein the flat contact surface of the passage hole may be arranged in parallel to the second bearing surface. In an embodiment, two passage holes with two flat contact surfaces are provided, wherein both contact surfaces are arranged in parallel to the second bearing surface. This offers the advantage that the device according to the invention can be connected with a safety climbing rung in an easy and reliable manner.

If the retaining means comprise a magnetic element which is dimensioned and positioned at the device such that the device is adapted to be positioned at a metallic structure, in particular an electricity pole, solely with the aid of the magnetic element, the device according to the invention can at first be arranged at the structure to be climbed in a very easy manner with the aid of the magnetic element. For this purpose, the device must merely be brought into contact with a magnetic or magnetizable region of the structure to be climbed by means of the magnetic element. Thus, the person mounting the device according to the invention has both hands free for finally fixing the device according to the invention (e.g. with the aid of ropes, chains, karabiners, etc.) at the structure to be climbed.

In another advantageous embodiment of the device according to the invention, a third redirecting means and optionally a fourth redirecting means are provided, wherein the second redirecting means, the third redirecting means and optionally the fourth redirecting means are preferably arranged vertically one upon the other. The arrangement of such further redirecting means offers the advantage that in case of a fall the force of the rope is not completely transmitted to the second redirecting means and the mechanism for automatically locking off the rope, but that this force is at first partly absorbed by the third and possibly the fourth redirecting means and is thus reduced. This, however, requires a compromise in that during normal ascent the rope should be adapted to be pulled as smoothly as possible, while in case of an imminent risk of a fall it is advantageous for the force acting on the mechanism not being too high in order to protect the mechanism and the rope.

The redirecting means and/or the rope guide, which may be constituted by low-friction rollers, may be made of a metallic material or a plastic material. While metallic materials are particularly robust and have a long service life, they also have a higher weight. Redirecting means of plastic material offer the advantage that they are relatively light. Further, plastic materials may be used which retain abrasion marks produced by the rope in case of to stress caused by a fall. This applies in particular if the plastic material is selected to be polyoxymethylene (POM), in particular a homopolymer (POM H). In this case a rope guided through the device according to the invention leaves noticeable abrasion marks on the guide rollers. This offers the advantage that the guide rollers can serve as an indicator showing if the device has already been subjected to stress caused by a fall. If so, an expert should check the device for its operational reliability prior to further use.

Rope friction at the redirecting means is particularly small when the first redirecting means, the second redirecting means, the third redirecting means and/or the fourth redirecting means comprise pivot bearings, in particular roller bearings. Advantages resulting therefrom have already been described in the context of the guide member.

In case of a fall, an upward directed force normally acts upon the device according to the invention since an ascending person clips the rope into safety elements (e.g. safety climbing rungs) during ascent and in case of a fall the rope is deflected at these safety elements. To prevent the upward directed force of the rope from affecting the position of the device according to the invention in case of a fall, it is advantageous for the retaining means to comprise two lower retaining elements spaced apart from each other which are preferably arranged on the outer faces of the device and are particularly preferably moveably arranged. Such retaining means may be metallic eyes, for example, which serve as engagement points for a chain or another fixing means which is placed, from a side of the device, around a fixing element, for example the rung or a rib of an electricity pole, and then clipped into the opposite metallic eye. Two retaining means spaced apart from each other are advantageous since they can be arranged such that, when the device is fixed, there remains a free space for passage of the rope and there is no risk that the rope gets caught in the fixing element (e.g. chain, another rope, etc.).

Alternatively, the retaining means may comprise at least one passage hole with a flat contact surface for fixedly tensioning the device with the aid of a belt, wherein the flat contact surface of the hole may be arranged in parallel to the first bearing surface. In this case, the device according to the invention can also be fixed in an easy and reliable manner in a horizontal direction to an electricity pole with the aid of a belt. Special safety requirements are met when two superposed holes with flat contact surfaces are arranged one upon the other and the device is connected with an electricity pole via two belts acting independently of each other.

The system described herein further relates to the use of a fall protection device to be installed at the bottom of a structure to be climbed (i.e. in the lower region) and for protecting an ascending person with the aid of the fall protection device arranged below the ascending person.

BRIEF DESCRIPTION OF THE DRAWINGS

Further advantageous embodiments of the device according to the invention are described hereinafter with reference to the drawings, in which:

FIG. 3 shows a view of the device according to the invention of FIG. 2 as indicated by the arrow III in FIG. 2, FIG. 4 shows an enlarged view of the region marked by a circle in FIG. 3.

DETAILED DESCRIPTION OF VARIOUS EMBODIMENTS

Figure 1:
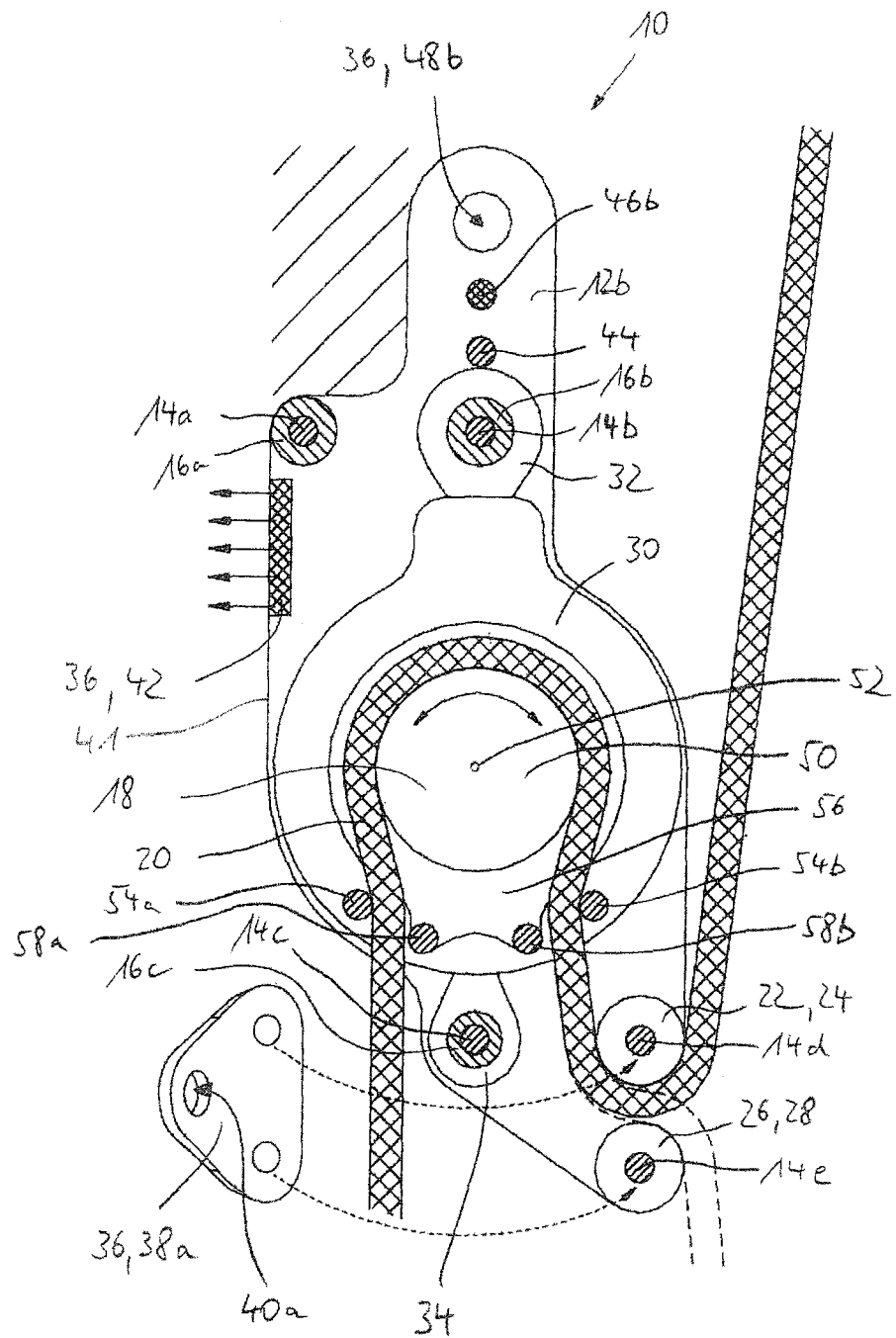
FIG. 1 shows a front view of a first embodiment of a device according to the invention for protection during ascent with a side part being removed and an angle element being dismantled.

FIGS. 1 to 4 show an embodiment of a device 10 according to the invention. It is essentially composed of:
- side portions 12a, 12b
- a rope passage inhibiting device 30 including fastening eyes 32, 34 and a first redirecting means 18
- a second redirecting means 24 and
- retaining means 36.

The device shown in FIGS. 1-4 has a length of approximately 40 cm and a width of approximately 16 cm.

The first side portion 12a and the second side portion 12b laterally define the device by essentially smooth outer surfaces. The distance of the outer surfaces to each other (thickness of the device without projecting bolt heads) is approximately 5.5 cm. The side surface 12a is not shown in FIG. 1 such that the elements of the device according to the invention located behind said side surface can be seen. The side surfaces 12a, 12b are connected with each other via a plurality of stud bolts 14a, 14b, 14c, 14d, 14e, wherein the stud bolts 14a, 14b, and 14c extend through spacer sleeves 16a, 16b, 16c which define the distance between the right-hand side portion 12a and the left-hand side portion 12b.

The side portions 12a, 12b are preferably made of a material resistant to bending and preferably have a thickness of more than 3 mm. In the illustrated embodiment, the side portions 12a, 12b are made of steel having a thickness of 4 mm. The spacer sleeves shown have a length of 45 mm.

The first redirecting means 18 arranged between the side portions 12a and 12b serves for deflecting by approximately 180° a rope 20 introduced into the device from below, said rope having a diameter of 12 mm in the illustrated embodiment. The stud bolt 14d extends through three pivot bearings 22a, 22b, 22c arranged side by side and which form a second redirecting means 24 and deflect the rope again by approximately 180° and allow the rope to exit the device at a side in an upward direction.

As a guide member 26 further pivot bearings 28a, 28b, 28c are arranged at the stud bolt 14e below the second redirecting means 24 at a distance of approximately 13 mm to the pivot bearings 22a, 22b, 22c. This guide member 26 prevents a slack rope emerging from the device from substantially changing its position inside the device. In FIG. 1, the path of a rope, which is not under tension, emerging from the device is shown by a dashed line. The guide member 26 further offers the advantage that the rope when under tension can be guided in a downward direction without there being a risk that the rope is mechanically damaged due to friction at small radii or edges.

A washer (not shown) each and a spacer 25a, 25b each are located laterally adjacent to the pivot bearings 22a, 22c, 28a, 28c. The washers prevent the lateral pivot bearings 22a, 22c, 28a, 28c from abutting against the spacers 25a, 25b on the inside. The spacers 25a, 25b have radii of preferably at least 5 mm, particularly preferably at least 10 mm, such that a rope 20, which may laterally exit the device, does not laterally rub against sharp edges thus suffering mechanical damage.

As can be seen in particular in FIG. 1, the spacer sleeves 16b and 16c serve not only for defining the distance of the right-hand side portion 12a from the left-hand side portion 12b. They simultaneously serve for fixing the rope passage inhibiting device 30 via its upper fastening eye 32 and its lower fastening eye 34 inside the device 10.

Both at the right-hand side portion 12a and the left-hand side portion 12b an angle element 38a, 38b each is arranged as a retaining means 36. In FIG. 1, only the angle element 38a is shown by way of example. The two angle elements are each bolted to the side portions 12a and 12b, respectively, by the stud bolts 14d and 14e, respectively. Through the openings 40a, 40b provided in the angle elements 38a, 38b, for example, a chain or another fastening means can be guided to fix the device 10 according to the invention to a pole or to any other structure to be climbed. Fixing with the aid of the angle element 38 primarily serves ensure that, in case of a fall of the ascending person, the device according to the invention is not moved upward by the tensile force of the rope acting in an upward direction.

Figure 2:
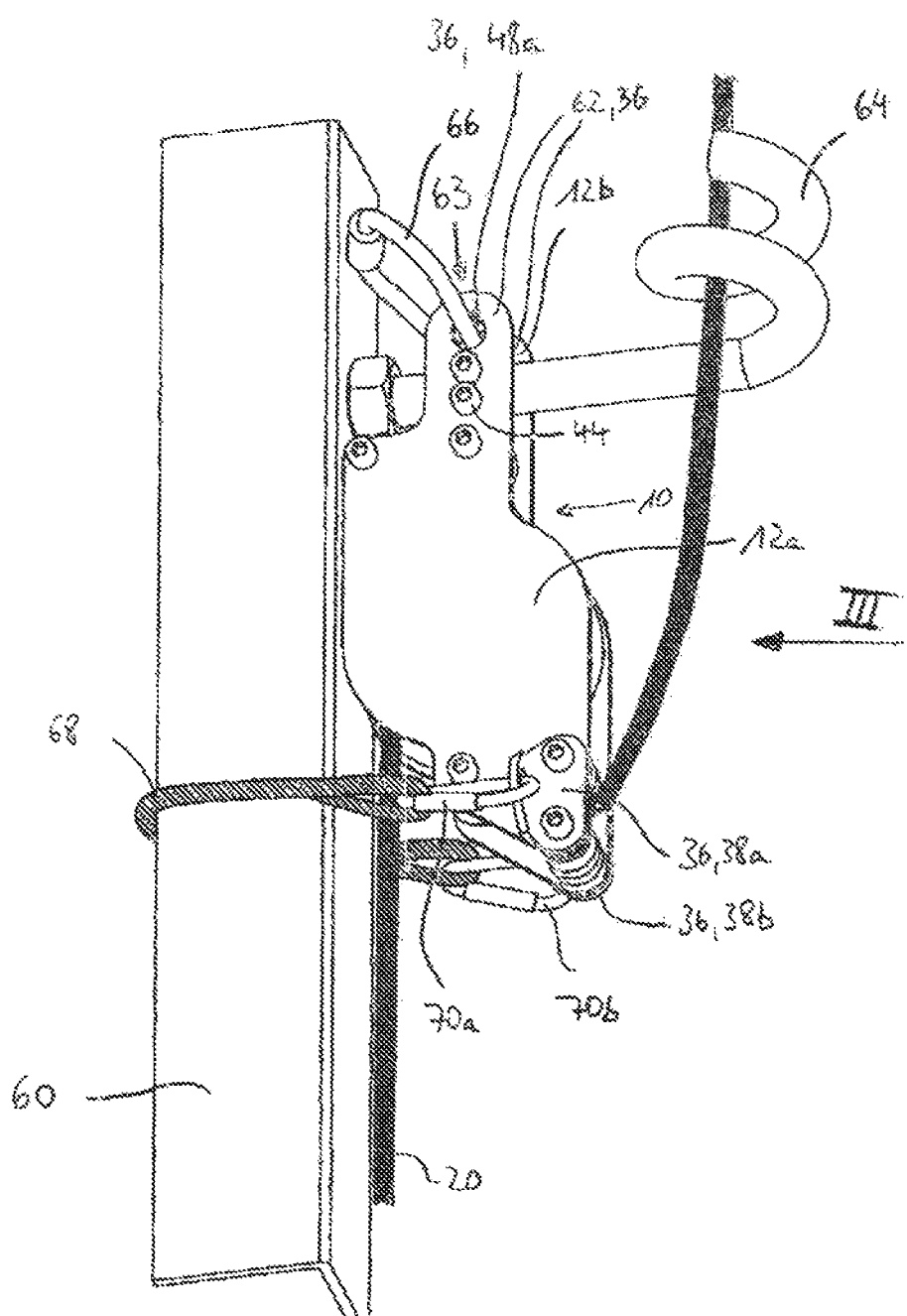
FIG. 2 shows the device according to the invention of FIG. 1 in a state as positioned at and fixed to an electricity pole.

As can be seen in FIG. 1, in the region of a lateral flat bearing surface 41 of the device according to the invention a large-area magnet 42 is provided which is dimensioned such that it carries the device when being in surface abutment on an electricity pole made of magnetic material. It is at the discretion of one skilled in the art whether to select a permanent magnet or an electromagnet. Providing a magnet offers the advantage that the device can first be prepositioned without any further safety means before using retaining means, such as a rope 68 and karabiners 70a, 70b as shown in FIGS. 2 and 3, for example, to fix the device to the structure (an electricity pole 60 in FIGS. 2 and 3) with the aid of the angle elements 38a, 38b.

Above the stud bolt 14b the device comprises another bolt or another stud 44 which extends from the right-hand side portion 12a to the left-hand side portion 12b. The bolt or the stud 44 can be fixedly or rotatably supported. Above the bolt or the stud 44 further studs 46a, 46b are arranged which extend from the side portion 12a and from the side portion 12b, respectively, in a horizontal direction towards the center of the device. Between the studs a free space is provided which allows a rung 64 (cf. FIG. 4) or another retaining element to be guided through the free space provided between the studs 46a, 46b. The function of the studs 46a, 46b will hereinafter be explained in detail.

Above the studs 46a, 46b the side portions 12a, 12b comprise passage holes 48a, 48b which are further retaining means 36 within the meaning of the invention. They serve to guide a stud or a karabiner not shown in FIG. 1 through both holes to fix the device in a suspended manner to the structure. Details will hereinafter be elucidated with reference to a drawing.

As can be seen in FIG. 1, the first redirecting means 18 forms part of a rope passage inhibiting device 30 fixed between the first side portion 12a and the second side portion 12b. The illustrated rope passage inhibiting device 30 is a device which operates according to the same principle as a fall protection device introduced by the company International Safety Components Ltd. (GB) under the product name ALF for the first time in the fall of 2009.

The rope passage inhibiting device 30 comprises a guide roller 50 having a notch-type depression including a toothing. The guide roller 50 can rotate in two directions about the rotation axis 52. The rope passage inhibiting device 30 further comprises two fixed elements 54a, 54b and a rotatably supported element 56 having clamping elements 58a, 58b molded thereto.

If the ascending person falls, the rope is pulled by the person around the safety climbing rung 64 around which the rope has been wound last and exerts a tensile force in an upward direction. Thus, the rope 20 exerts an upward directed tensile force on the device 10 according to the invention and is pulled through the device. If a certain rotational speed in the redirecting means 18 is exceeded, the rotatable part 56 moves in the direction of movement of the rope and clamps the rope between a clamping element 58a and 58b, respectively, of the rotatable portion 56 and a fixed element 54a and 54b, respectively. When an ascending person falls, the rope is thus clamped by the rope passage inhibiting device 30 after a short falling phase and prevented from moving any further. The person being at a risk of falling is then safely held by the rope 20.

As can be seen in FIG. 1, the clamping elements 58a, 58b have radii for inhibiting passage of the rope during clamping operation without any sharp edges. The clamped rope can be released by pulling from the side of the rope opposite the person. Due to the symmetrical configuration of the clamping mechanism said mechanism operates in both directions of movement of the rope.

The second redirecting means 24 causes additional rope friction which reduces the tensile force of the rope upstream of the first redirecting means and the rope passage inhibiting device 30 provided in the region of this redirecting means. Thus, the load acting on the rope during disconnection and the load acting on the rope passage inhibiting device 30 can be reduced. To further reduce the load, a third and possibly a fourth redirecting means may be provided above the second redirecting means. It is of course also possible to provide a fifth, a sixth and further redirecting means to further reduce the load.

As shown in FIG. 2, the illustrated exemplary embodiment is ideally suited for use in connection with a safety climbing rung, for example with the safety climbing rung described in European patent document EP 577 587 B1. However, it can also be used in connection with other structures, in particular with standard climbing rungs of electricity poles.

For fixing the device 10 to an electricity pole, said device is moved in an upward direction along an electricity pole 60 until the retaining elements 62 serving as the retaining means 36 and being configured at the side portions 12a, 12b and having passage holes 48a, 48b embrace a safety climbing rung 64 fixed to the electricity pole 60 and a karabiner 66 can be guided through the passage holes 48a, 48b in the retaining elements 62 (cf. FIGS. 2-4). As can in particular be seen in FIG. 4, the studs 44, 46a, 46b are dimensioned such that the safety climbing rung 64 has only little play between the karabiner 66 and the studs 44, 46a, 46b. In practice, the safety climbing rungs have a diameter of approximately 24 mm. A preferred distance between the studs 46a, 46b and between a karabiner guided through the passage holes 48a, 48b and the stud 44 therefore is approximately 28 mm.

Preferably, in the lower region the device according to the invention is additionally fastened to the poles 60 by a chain or another fastening element via the angle elements 38a, 38b. In FIGS. 2 and 3, a rope 68 comprising a karabiner 70a, 70b is shown as the fastening element. Thus, an upward acting tensile force of the rope (which occurs when the person is at a risk of falling, for example) can be prevented from moving the device according to the invention out of its position and folding it upward, for example.

In the exemplary embodiment described above, as many standard parts as possible were used to keep the manufacturing costs low. It goes without saying that the device can be manufactured with fewer parts if several elements are configured as integral parts. For example, the side portions 12a, 12b and the rope passage inhibiting device 30 can be integrally formed with each other and combined to form one component.

FIGS. 5-12 show a second and a third embodiment of the device according to the invention. For a better understanding, identical elements or elements having the same function will hereinafter be designated by the same reference numerals as in the first embodiment.

The overall height of the second and third embodiments is approximately 26 cm, the overall width is approximately 24 cm. The depth without bolt heads is approximately 10 cm.

The second and third embodiments also comprise side portions 12a, 12b, a rope passage inhibiting device 30 including a first redirecting means 24, and retaining means 36. Again, the side portions 12a, 12b define the device by essentially smooth outer surfaces. In contrast to the first embodiment, a central portion 72 is arranged between the side portions 12a, 12b. With regard to the material and the material thickness of the side portions 12a, 12b and of the central portion 72, the above explanations concerning the side portions 12a, 12b of the first embodiment apply to the second and third embodiments.

Between the central portion 72 and the side portion 12b the rope passage inhibiting device 30 is arranged. The interior of the rope passage inhibiting device 30 is not shown in FIGS. 5 to 13. However, since it is identical with the interior of the rope passage inhibiting device 30 of the first embodiment shown in FIGS. 1 to 4, reference is hereby made to these Figures.

The housing shape and the mode of fastening of the rope passage inhibiting device 30 are not identical. In the second and third embodiments the rope passage inhibiting device 30 is fixed with the aid of two bolted connections 73a, 73b between the central portion 72 and side portion 12b. For accommodating the bolts two corresponding bores 74 are provided in the rope passage inhibiting device 30 (cf. FIG. 13).

Figure 13:
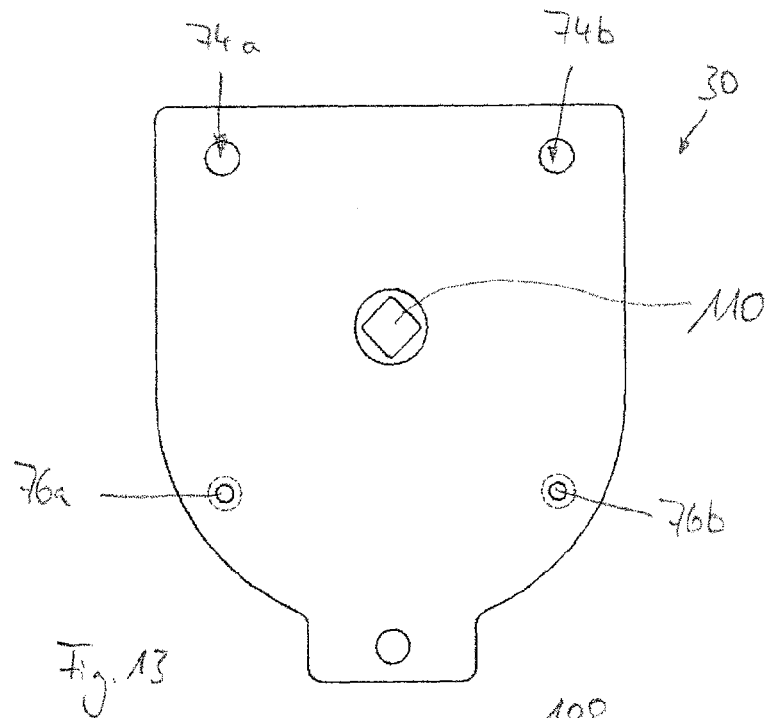
FIG. 13 shows a side view of the rope passage inhibiting device according to the third embodiment.

By means of the bolts 76 indicated in FIG. 13 the housing of the rope passage inhibiting device 30 is bolted.

Figure 10:
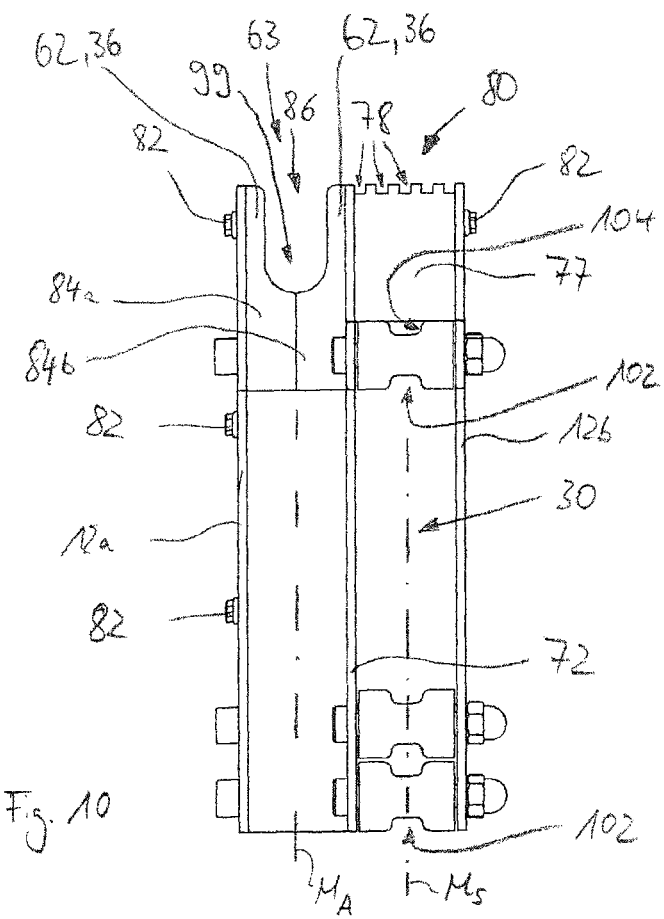
FIG. 10 shows a front view of the second embodiment.

An essentially parallelepiped-shaped element 77 is also arranged between the central portion 72 and side portion 12b, the upper side of said parallelepiped-shaped element 77 comprising longitudinal channels 78 and serving as a tread 80 together with the upper edges of the central portion 72 and of side portions 12a, 12b (cf. FIG. 10). In the illustrated embodiment, the element 76 is made of polyoxymethylene copolymer (also referred to as POM C). It is bolted to the side portion 12b and the central portion 72 by means of self-tapping bolts 82.

Between the central portion 72 and side portion 12a another two elements 84a, 84b configured mirror-symmetrically to each other are arranged which together form a U-shaped groove 88 accessible from the upper side of the device (cf. FIG. 10). Both elements 84a, 84b are bolted to side portion 12a and to central portion 72, respectively, by means of self-tapping bolts 82. For bolting the inner element 84b, the central portion 72 and the parallelepiped-shaped element 77, self-tapping bolts not shown can be used. For this purpose, preferably bolt holes are provided in the vertical section on the inner side of the element 84b such that the heads of the self-tapping bolts do not project after being bolted to the central portion 72 and the parallelepiped-shaped element 77. In the illustrated second and third embodiments, two bolts were used for bolting the element 84b to the central portion 72 and the parallelepiped-shaped element 77.

The width of the U-shaped groove 88 preferably is 20 mm to 35 mm, and particularly preferably 24 mm to 30 mm. In the illustrated embodiment, a width of 26 mm was selected. The height of the U-shaped groove 88 is preferably larger than 24 mm, particularly preferably larger than 35 mm. In the second and third embodiments it was selected to be 50 mm such that a safety climbing rung according to EP 577 587 B1 can clearly be sunk into the U-shaped groove.

Figure 5:
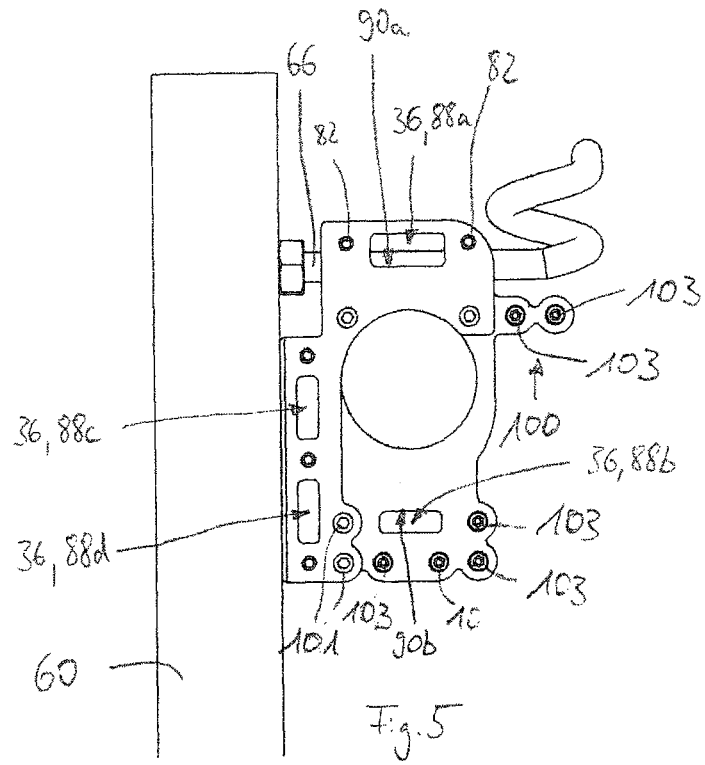
FIG. 5 shows a view from the left of a second embodiment of a device according to the invention together with a safety climbing rung mounted to an electricity pole.
Figure 6:
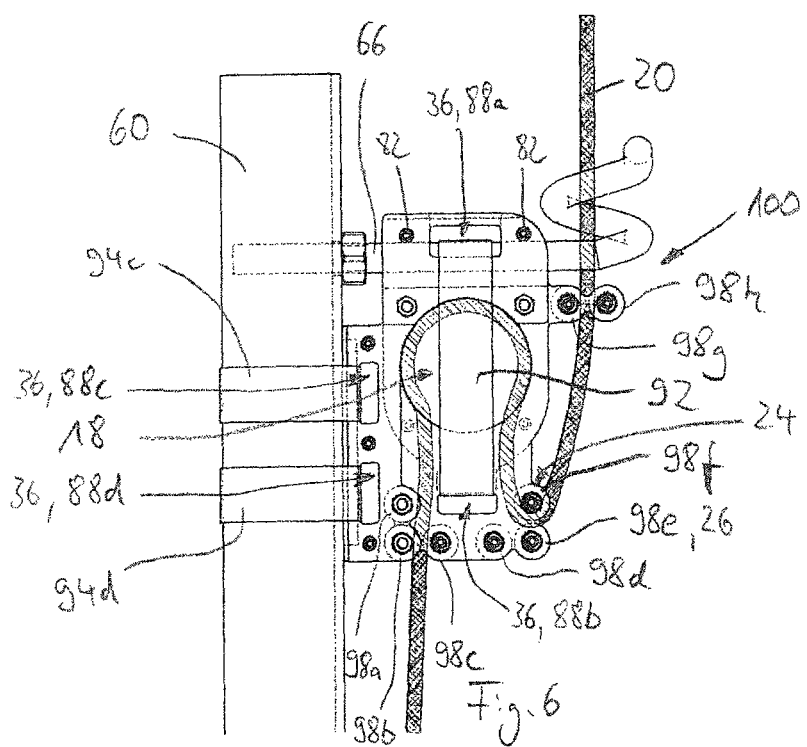
FIG. 6 shows a view from the left of the second embodiment with electricity pole and inserted rope.
Figure 7:
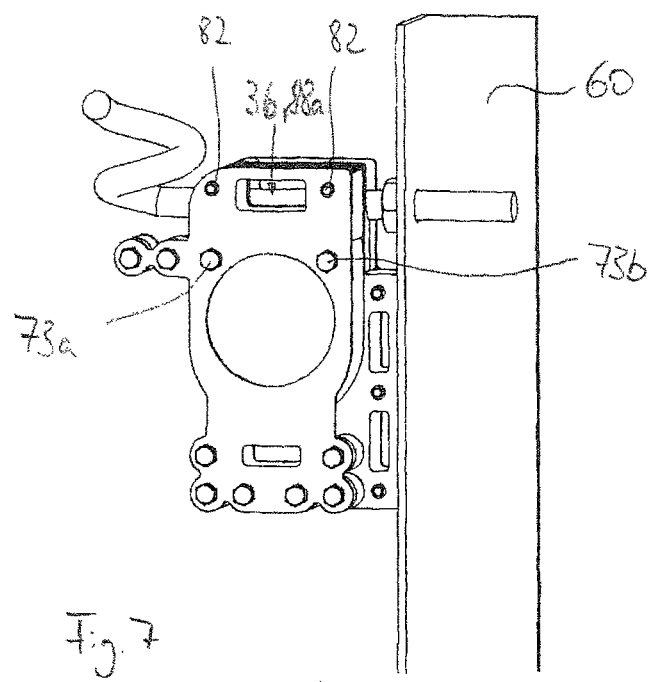
FIG. 7 shows a view from the right of the second embodiment with electricity pole.
Figure 8:
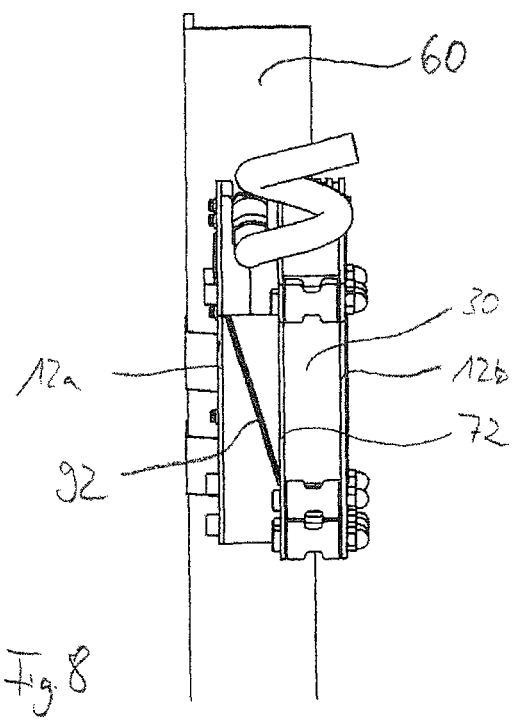
FIG. 8 shows a front view of the second embodiment with electricity pole.
Figure 9:
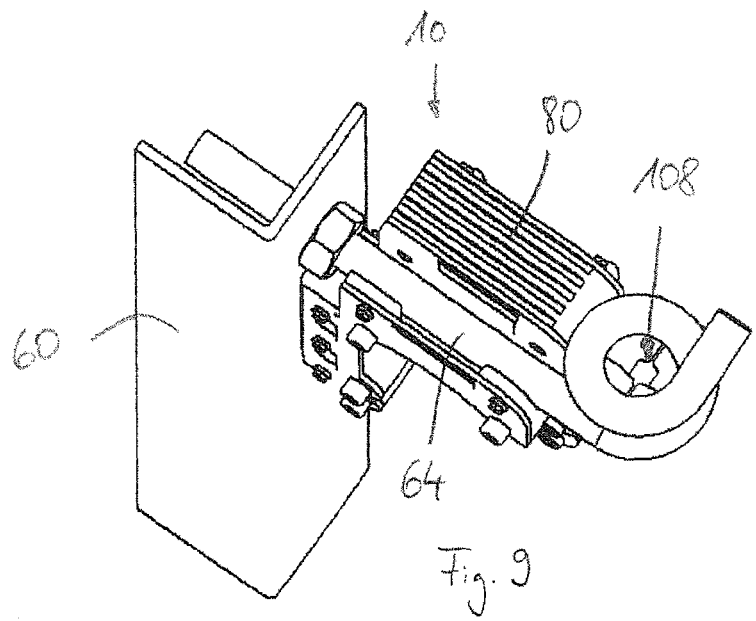
FIG. 9 shows a top view of the second embodiment with electricity pole.

As can in particular be seen in FIGS. 5 to 7, the device comprises in its upper region a passage hole 88a with a flat contact surface 90a as the retaining means 36. Further passage holes 88b, 88c, 88d of similar configuration having flat contact surfaces 90b, 90c, 90d are provided in the lower region and the region of the first bearing surface 41, respectively. The passage holes 88a, 88b serve to fix, with the aid of a vertical belt 92, the device to a safety climbing rung 64 extending through the U-shaped groove. For this purpose, the passage hole 88a is arranged such that the distance between the lowermost point of the U-shaped groove and the flat contact surface 90a is smaller than the diameter of the safety climbing rung 64. As a result, as can be seen in FIGS. 5 to 7, the safety climbing rung 64 projects beyond the flat contact surface 90a. With the aid of the vertical belt 92 the device 10 can thus be pressed against the safety climbing rung and fixed with respect to it.

In the same manner, the device 10 can be fixed, with respect to an electricity pole 60, in a horizontal direction by means of two horizontal belts 94c, 94d via the passage holes 88c, 88d. It goes without saying that generally one horizontal belt would be sufficient for completely fixing the device. The illustrated second and third embodiments meet more stringent safety requirements in that even a complete failure of one of the belt connections 94c, 94d does not affect the safety of the person to be protected.

Figure 11:
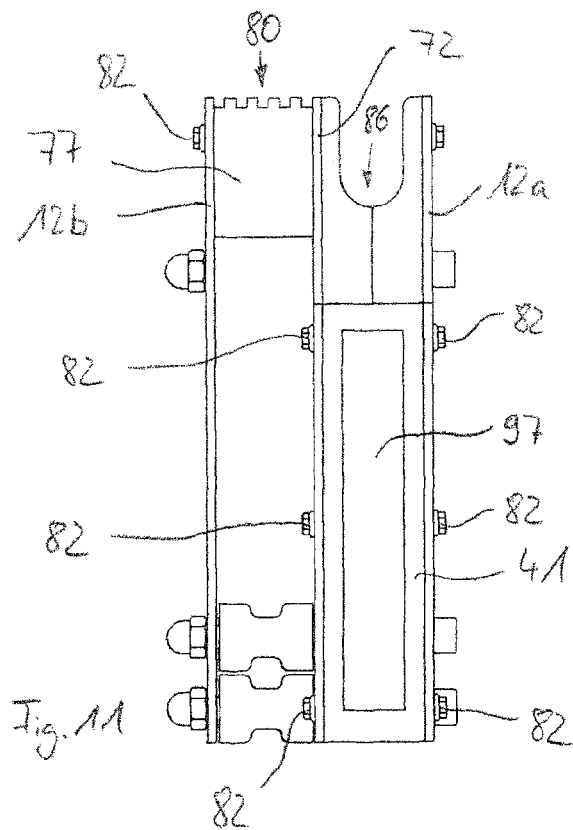
FIG. 11 shows a rear view of the second embodiment.
Figure 12:
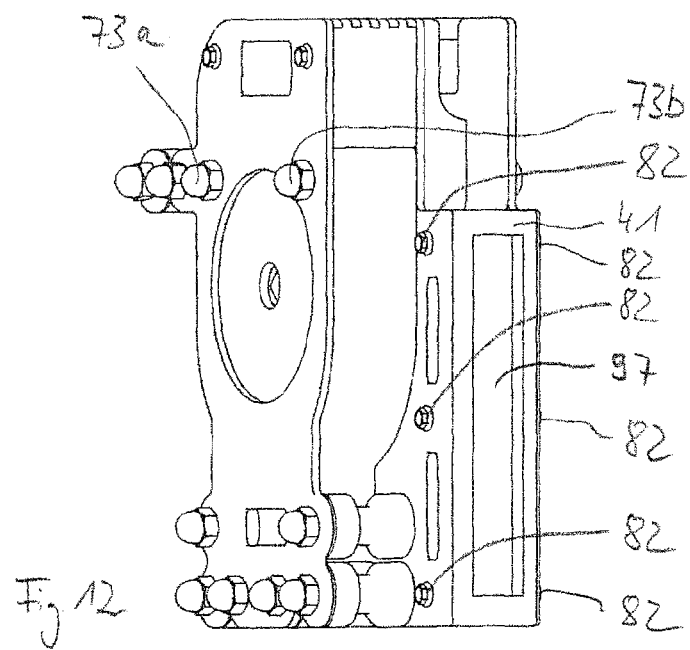
FIG. 12 shows a three-quarter rear view of a third embodiment of the device according to the invention based on the second embodiment.

As is in particular shown in FIGS. 11 and 12, an essentially trapezoidal element 96 of POM C is arranged in the region of the first flat bearing surface 41 between the central portion 72 and side portion 12a, said element 96 being bolted to the central portion 72 and the side portion 12a by means of three self-tapping bolts 82 each, on each side. The element 96 projects with respect to the lateral edges of the central portion 72 and side portion 12a (preferable by a few millimeters) such that an electricity pole 60 is not damaged when the device is placed on it. In the element 96 an essentially parallelepiped-shaped recess 97 for accommodating a magnet not shown is provided. Said magnet can, for example, be glued into the recess 97. The magnet is preferably selected such that it is somewhat set back when being inserted. To finally fix the magnet in the recess 97 and to configure the region of the parallelepiped-shaped recess 97 as a portion of the first flat bearing surface 41, the recess 97 can be filled with a suitable filler after the magnet has been inserted.

Between side portion 12b and the central portion 72 a total of eight rollers 98 are arranged as redirecting means 24 and as rope guide 100, respectively. Said rollers are made of a POM H. They are rotationally symmetrically configured and comprise in their center a recess 102 with slopes 104 directed inward to prevent a rope guided over the rollers 98 from drifting to the outside. The rollers 98a, 98b are supported via through bolts 101 which connect the side portions 12a, 12b with each other. The rollers 98c-h are supported via connecting bolts 103 which connect the central portion 72 and side portion 12b with each other. To ensure that the rollers 98 can rotate with as little friction as possible, sleeves or other means make sure that the distance between the central portion 72 and side portion 12b is always larger than the width of the rollers. For example, bolts with internal threads can be used as connecting means into which bolts can be inserted from both sides. A suitably selected length of the studs may ensure that sufficient space remains between the elements 12b, 72 connected with each other such that the rollers can rotate freely.

As can in particular be seen in FIGS. 5 to 7, the second bearing surface 99, configured as a U-shaped groove 86, and the first bearing surface 41 extend perpendicularly to each other.

With regard to guiding the rope inside the device shown in FIG. 6, reference is made to the first embodiment.

As can in particular be seen in FIGS. 5 and 6, the second and third embodiments of the device according to the invention comprise in the upper region an arm 106 laterally projecting from the device, which arm 106 includes the rollers 98g, 98h arranged as the rope guide 100. This arm is arranged and dimensioned such that it guides the rope in a low-friction manner in a vertically upward direction through the suspension eye 108 of a safety climbing rung according to EP 577 587 B1. The rollers 98g, 98h of the rope guide preferably have a distance of less than 9 mm from each other, particularly preferably a distance of less than 5 mm from each other. In the illustrated embodiment, the distance is approximately 2 mm. Since the rope 20 shown in some Figures has a diameter of 9 mm, the distance of 2 mm (or less) ensures that the rope does not drift from the central region of the rollers 98g, 98h comprising the recesses 102 to the outside and could thus not get jammed.

It goes without saying that with regard to the rope guide 100, instead of employing an arm laterally projecting from the device, the geometry of the device can be modified such that the rope guide is arranged inside the device.

As can in particular been seen in FIGS. 10 to 12, guiding of the rope, which is performed between the central portion 72 and side portion 12b, is provided laterally offset with respect to the second bearing surface 99. In the second and third embodiments, the center plane of the guide plane of the rope $M_S$ and the center plane of the second bearing surface $M_A$ have a distance of approximately 5 cm. Preferred distances for these planes are 2 to 10 cm.

Figure 14:
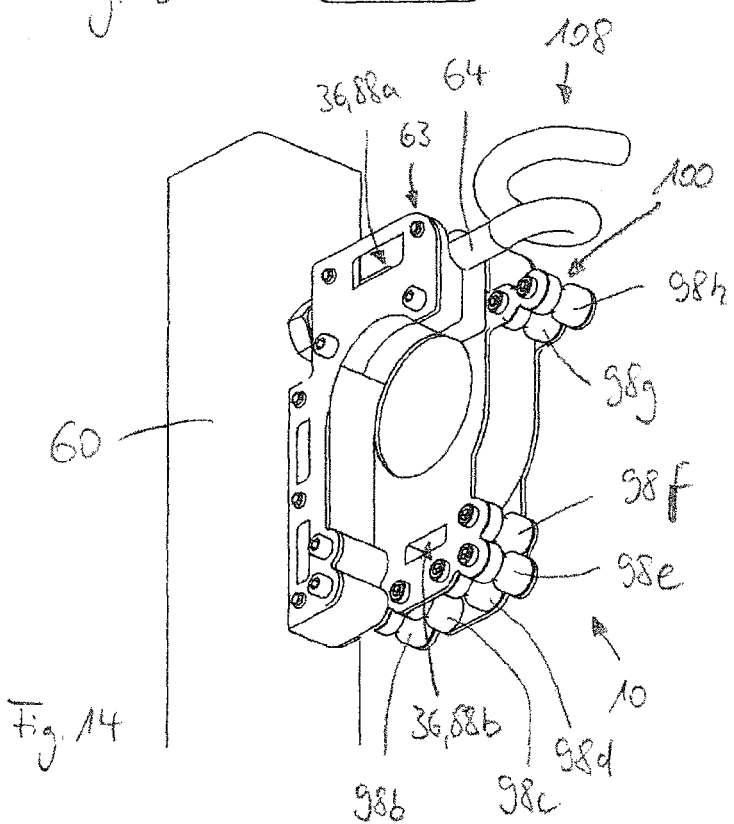
FIG. 14 shows a three-quarter bottom view of the second embodiment.

As can readily be seen in FIGS. 5 and 14, side portion 12b and the central portion 72 have radii in the region of the rollers 98 and the rope guide 100 which do not damage the rope 20.

As can be seen in FIGS. 12 and 13, in the third embodiment, the rope passage inhibiting device 30 comprises, in the region of the rotation axis of the first redirecting means 18, a profile or a depression 110 for engagement of a tool. In the illustrated embodiment, a recess for engagement of a square spanner is configured. This offers the advantage that in case of a fall of a person, employment of a "ratchet", a drive motor or another means using auxiliary motor force or known lever principles allows the person to be controllably lowered or lifted in an effort-saving manner by operating the rope passage inhibiting device as a rope drive.

Preferably the device according to the invention is used with ropes which ensure that in case of a fall of a person, the force acting upon the person is lower than 6 kN.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A device for protecting an ascending person during ascent and including a non-fixed rope that is to be carried by the ascending person, comprising:
   a retaining component that fixes the device to a fixed anchoring point in a predetermined position;
   a structural configuration which enables the introduction of the rope into the device, fixed in the predetermined position, from below;
   at least one first redirecting component by which the rope to be introduced into the device is guided through the device on a curved path;
   a mechanism that causes automatic locking off of the rope when the speed of movement of the rope through the device exceeds a predetermined limit value;
   at least one second redirecting component by which the rope emerging from the device is guided out of the device in the direction of ascent; and
   a laterally arranged flat first bearing surface, wherein, on an upper side of the device, a flat tread is configured.

2. The device according to claim 1, wherein the second redirecting component is a roller configured as a pivot bearing which is arranged on the side of the device opposite the first bearing surface at a distance of approximately 10 to 50 cm from the first bearing surface.

3. The device according to claim 2, wherein the pivot bearing is arranged on the side of the device opposite the first bearing surface according to at least one of the following:
   (i) at a distance of approximately 10 to 30 cm to the first bearing surface;
   (ii) at a distance of 15 to 25 cm to the first bearing surface; or
   (iii) to define a lateral boundary of the device.

4. The device according to claim 1, further comprising:
   a second bearing surface arranged transversely to the first bearing surface.

5. The device according to claim 4, wherein the second bearing surface is arranged such that a center plane of the second bearing surface extends in a laterally offset manner with respect to at least one center plane of at least one of the redirecting components or a rope guide.

6. The device according to claim 4, wherein the second bearing surface is of U-shaped configuration.

7. The device according to claim 1, wherein at least one of: the first redirecting component or the second redirecting component deflects the rope by 120° to 240°.

8. The device according to claim 1, wherein, in a region of the second redirecting component, a guide member is arranged, wherein between the guide member and the second redirecting component is a distance of 5 to 20 mm.

9. The device according to claim 8, the distance between the guide member and the second redirecting is 10 to 18 mm or 12 to 14 mm.

10. The device according to claim 1, wherein the retaining component comprises two upper retaining elements spaced apart from each other and including passage holes, which allow a structure on which the device is to be suspended to extend between the retaining elements, and wherein the device is adapted to be fixed to the structure in a suspended manner by guiding a safety element through the passage holes.

11. The device according to claim 10, wherein the retaining component includes an additional passage hole having a flat contact surface for fixedly tensioning the device with the aid of a belt.

12. The device according to claim 11, wherein the flat contact surface of the hole extends in parallel to the second bearing surface.

13. The device according to claim 1, further comprising:
   a third redirecting component, wherein the second redirecting component and the third redirecting component are vertically arranged one above the other.

14. The device according to claim 11, further comprising:
   a fourth redirecting component, wherein the second redirecting component, the third redirecting component and the fourth redirecting component are vertically arranged one above the other.

15. The device according to claim 1, wherein at least one of the redirecting components is made from a thermoplastic material.

16. The device according to claim 1, wherein at least one of the following is provided:
   a) the retaining component comprises two lower retaining elements spaced apart from each other or b) the retaining component comprises at least one passage hole with a flat contact surface for fixedly tensioning the device with the aid of a belt.

17. A method for protection during ascent using a device for protecting an ascending person during ascent, the device including:
   a retaining component that fixes the device to a fixed anchoring point in a predetermined position;
   a structural configuration which enables the introduction of a non-fixed rope into the device, fixed in the predetermined position, from below;
   at least one first redirecting component by which the rope to be introduced into the device is guided through the device on a curved path;
   a mechanism that causes automatic locking off of the rope when the speed of movement of the rope through the device exceeds a predetermined limit value;
   at least one second redirecting component by which the rope emerging from the device is guided out of the device in the direction of ascent; and
   a laterally arranged flat first bearing surface, the method comprising:
   placing the first bearing surface of the device on a flat bearing surface of an object to be climbed;
   fixing the device using the retaining component to object to be climbed;
   where the device is not with a preinstalled rope, guiding an end of the non-fixed rope in the direction of ascent into the device from below, around the first redirecting component and around the second redirecting component;
   connecting the non-fixed rope guided through the device with an ascending person;
   carrying the non-fixed rope by the ascending person during the ascent; and
   clipping the non-fixed rope at regular intervals into safety structures which allow the rope to be deflected in case of a fall and carry the weight of the ascending person.

18. A device for protecting an ascending person during ascent and including a non-fixed rope that is to be carried by the ascending person, comprising:
   a retaining component that fixes the device to a fixed anchoring point in a predetermined position;
   a structural configuration which enables the introduction of the rope into the device, fixed in the predetermined position, from below;
   at least one first redirecting component by which the rope to be introduced into the device is guided through the device on a curved path;
   a mechanism that causes automatic locking off and retention of the rope when the speed of movement of the rope through the device exceeds a predetermined limit value;
   at least one second redirecting component by which the rope emerging from the device is guided out of the device in the direction of ascent, wherein one or more of the at least one first redirecting component or the at least one second redirecting component is a pulley and wherein the rope is provided from the first redirecting component to the second redirecting component; and
   a laterally arranged flat first bearing surface.

* * * * *